United States Patent [19]

Niewold

[11] Patent Number: 5,746,303
[45] Date of Patent: May 5, 1998

[54] AUGER CONTROL

[75] Inventor: D. Wayne Niewold, Loda, Ill.

[73] Assignee: Hydra Fold Auger, Inc., Paxton, Ill.

[21] Appl. No.: 806,658

[22] Filed: Feb. 26, 1997

[51] Int. Cl.[6] ................................................ B65G 33/26
[52] U.S. Cl. ............................ 198/660; 198/657; 198/594
[58] Field of Search ............................. 198/657, 660, 198/586, 587, 588, 812

[56] References Cited

U.S. PATENT DOCUMENTS

| 2,606,645 | 8/1952 | Heine | 198/660 X |
| 3,712,681 | 1/1973 | Marino et al. | 198/657 X |
| 3,717,272 | 2/1973 | Chartier et al. | 198/657 X |
| 3,974,908 | 8/1976 | Keichinger | 198/594 X |

*Primary Examiner*—James R. Bidwell
*Attorney, Agent, or Firm*—Lockwood, Alex, FitzGibbon & Cummings

[57] ABSTRACT

A system for the control of an auger, such as for conveying agricultural particulate materials, is disclosed in which a discharge spout is attached to the discharge end of the auger tube, the discharge spout is both freely movable and adjustable in length, and the rotation of the auger may be controlled from a location on and adjacent to the discharge end of the discharge spout. Such control is accomplished by an electrical switch which controls a normally open hydraulic solenoid valve for in the alternative selectively bypassing or porting the hydraulic fluid to the hydraulic motor of the auger.

13 Claims, 1 Drawing Sheet

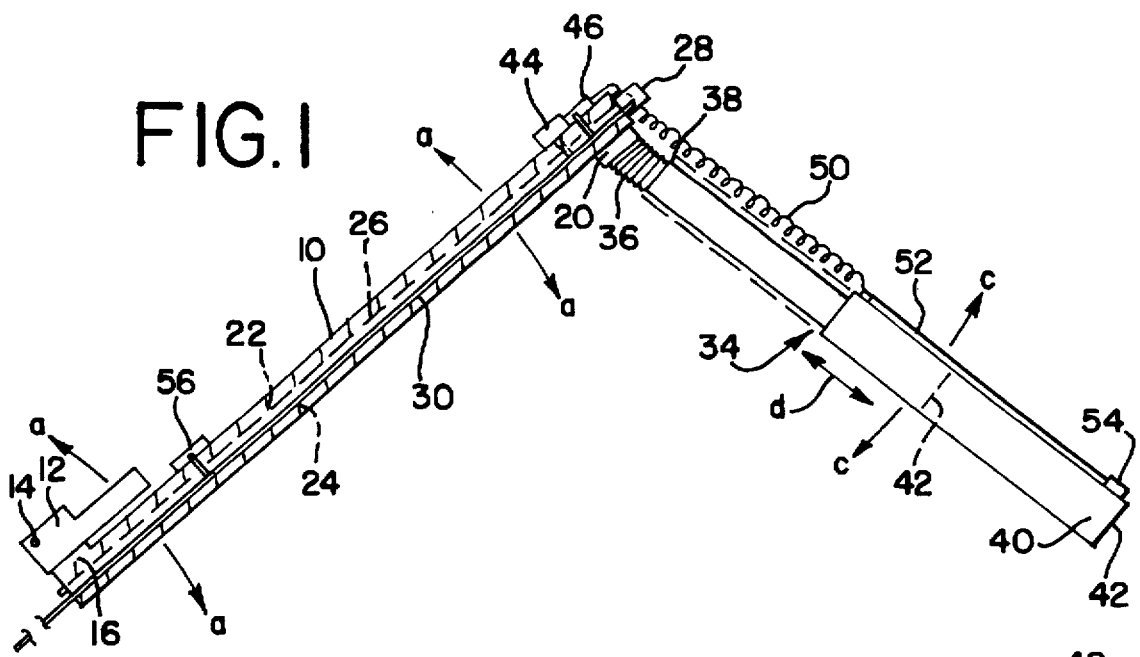
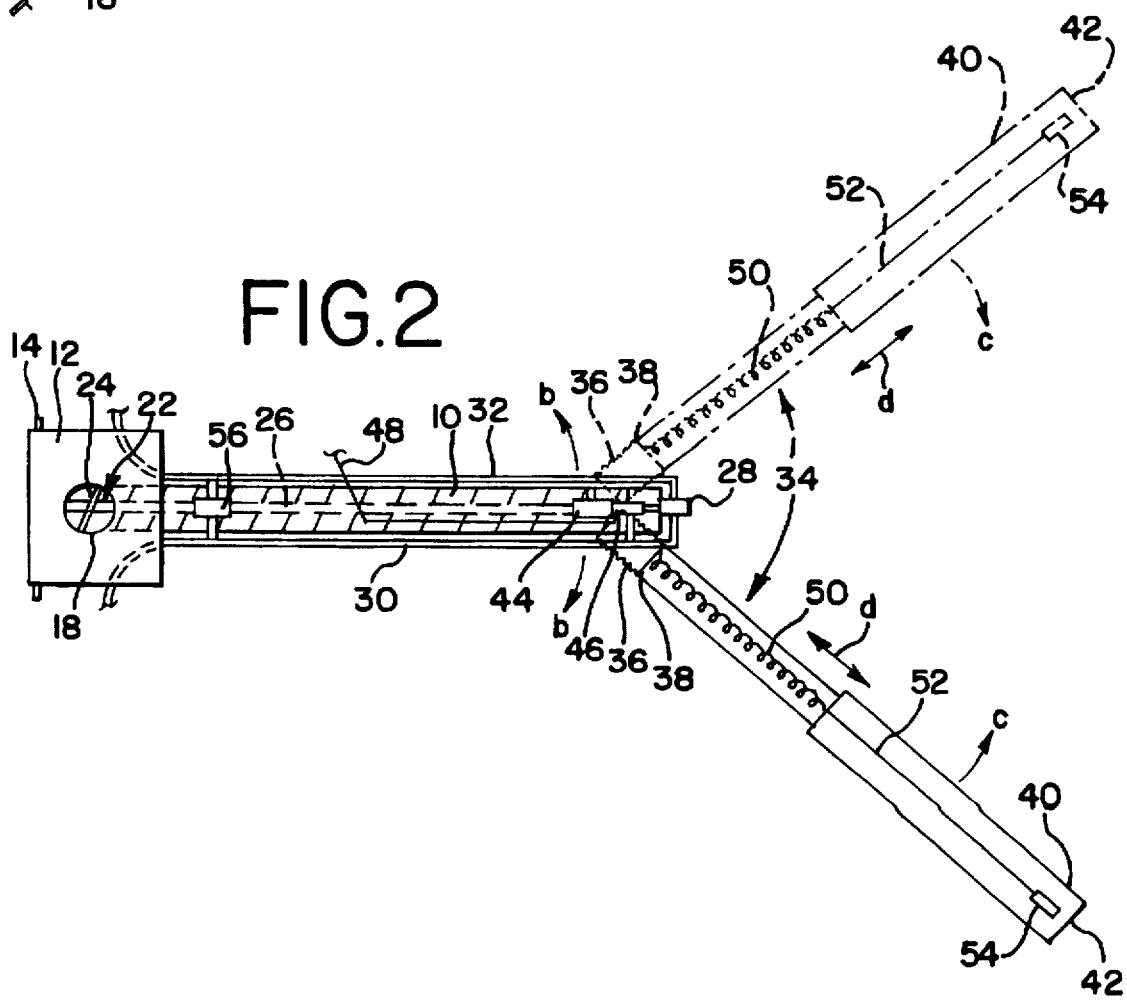

AUGER CONTROL

BACKGROUND AND SUMMARY OF INVENTION

The present invention is directed to an auger control and, more particularly, to a system for turning on and off an auger unit for transport of particulates, such as seed, grain or the like from a gravity box or truck.

Tubes having powered augers therein have been widely employed in the past to convey particulates such as grain or seed from a gravity box or truck, for example, to a planter to fill the planter. With the advent of wider planters, for example of up to 40 feet in width for planting up to 16 rows at the same time, discharge spouts have been utilized to maximize the width at which the seed may be discharged by the auger head to service the planter in order to minimize the number of times that the truck or gravity box has to be moved before replenishment of the planter is complete. When moving the discharge spout between the respective planter seed hoppers, the auger drive motor is usually stopped to prevent loss of seed, and is then restarted when the spout has been repositioned. In the past, control of the drive motor which typically is hydraulic, has either been accomplished by bypassing the hydraulic fluid at the auger tube discharge head in order to stop the hydraulic motor, or by complex and cumbersome mechanical linkages such as ropes, rods or the like which are manipulated by the operator.

The difficulty with these prior controls is that the discharge opening for the discharge spout itself may be quite remote from the auger head, particularly where the auger is to be used in the transport of seed for filling very wide 16 row planters. Thus, it would be desirable to be able to control the hydraulic motor between on and off, but at the location of the discharge opening of the spout itself because this would maximize the ability to accurately direct the material being discharged with a minimum of material loss. However, this is difficult because the hydraulic motor for the auger is located at the discharge head of the auger tube and not in the discharge spout and, thus, is remote from the discharge opening of the discharge spout. Moreover, the routing of the hydraulic lines to the discharge opening of the discharge spout would be cumbersome and difficult, particularly where the discharge spout is telescopically extendable and/or movable relative to the discharge head of the auger tube. Under those circumstances the rerouted hydraulic hoses would tend to get in the way, be a safety hazard to personnel and might get snagged or damaged during operation.

Accordingly, it is an important purpose of the present invention to provide an auger control system in which the power to the auger may be readily controlled and turned on and off by an operator adjacent the discharge opening of a discharge spout. Another advantage of the present invention is that this control may be effected at a location adjacent the discharge opening of a telescoping discharge spout without the existence of cumbersome or bothersome hydraulic hoses, ropes or other mechanical linkages. Still another advantage of the present invention is that the system of the invention permits the filling of even the widest 16 row planters without the need to interrupt the filling operation to reposition the gravity box or truck from which the seed is being dispensed. Still another advantage of the present invention is that the system of the invention is still capable of operation and control as was previously possible at the auger discharge head or other location remote from the discharge opening of the discharge spout if desired and/or in the event of malfunction of the control adjacent the discharge spout opening. Yet another advantage of the control system of the present invention is that it can be alternatively used in open or closed center hydraulic systems.

In one principal aspect of the present invention, a system for the control of an auger comprises an elongate auger tube having an auger mounted for rotation therein, an inlet to the tube for introducing a particulate material to the tube to be conveyed in the tube by the auger when it rotates, and a discharge from the tube spaced from the inlet for discharging the material conveyed in the tube from the tube. A discharge spout is attached to the tube for receiving and directing the material discharged from the discharge of the tube, and the discharge spout is movable relative to the tube and has a discharge opening spaced from and remote to the tube and tube discharge. A motor is on the tube and remote to the discharge opening of the discharge spout to rotate the auger in the tube, and control means is mounted to and selectively operable from a location on the discharge spout adjacent the discharge opening of the discharge spout to start and stop the rotation of the auger.

In another principal aspect of the present invention, the discharge spout is elongate and is adjustable in length and, in a preferred embodiment, is telescopically adjustable.

In still another principal aspect of the present invention, the aforementioned control means includes a control switch mounted to the discharge spout adjacent the discharge opening, and an electrical conductor extending from the switch and over substantially the length of the discharge spout. At least a portion of the electrical conductor is coiled to accommodate the changes in length of the discharge spout when it is telescopically adjusted.

In still another principal aspect of the present invention, the motor is fluid powered and the control means bypasses the fluid of the motor to stop the rotation of the auger.

In still another principal aspect of the invention, the control means includes a normally open, solenoid operated fluid bypass valve which when open bypasses the motor.

In still another principal aspect of the present invention, the control means also includes a second fluid valve which is selectively operable at a second location remote from the location adjacent the discharge opening of the discharge spout, and the normally open, solenoid operated fluid bypass valve and the second fluid valve are in series fluid flow relationship to each other.

In still another principal aspect of the present invention, the control means is also selectively operable at at least a second location remote from the location adjacent the discharge opening and, in a preferred embodiment the control means is operable from the second location if it is not operable from the location adjacent the discharge opening of the discharge spout.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a schematic, side elevational view of an auger tube and discharge spout including the control system of the present invention; and FIG. 2 is a plan view of the auger tube, discharge spout and control system substantially as shown in FIG. 1, and showing the discharge spout moved between two of its possible positions relative to the auger tube.

DESCRIPTION OF THE PREFERRED EMBODIMENT

With reference to the drawing, the system of the present invention comprises an elongate auger tube 10 which at one end is adapted to be mounted for movement relative to some form of container (not shown) for particulate materials which are to be conveyed by the auger tube. Such containers are preferably mobile and, for example may be a gravity flow wagon box, such as shown in my U.S. Pat. No. 3,265,253 or a truck body such as shown in my U.S. Pat. No. 4,419,037.

The manner in which the auger tube 10 is mounted to the container for receipt of materials therefrom may widely vary. For purposes of illustration a hopper 12 is shown in the drawing which may be mounted to the material supply container for pivotal movement in the vertical about pins 14 as shown by the arrows a in FIG. 1. The auger tube 10 at its end adjacent the hopper 12 includes an inlet 16 for introducing the particulates to the auger tube through an opening 18 in the bottom of the hopper 12. The auger tube 10 is preferably mounted with its inlet 16 in communication with the opening 18 and in a manner so that it is capable of rotation in a horizontal plane parallel to the bottom of the hopper 12, as shown by the arrows b in FIG. 2. Thus, the auger tube 10 may effectively be swivelable relative to the material supply container as shown by the arrows a and b in FIGS. 1 and 2. Details of the mountings of the hopper 12 and the auger tube 10 are not shown in the drawings as they are known in the art. One form of suitable mounting is shown in my aforementioned U.S. Pat. No. 3,265,253, the details of which are incorporated herein by reference.

A discharge opening 20 is located adjacent the opposite end of the auger tube, as shown in FIG. 1, for discharging the material which is to be conveyed in the tube from the tube 10. An auger 22 having helical or spiral flights 24 extends longitudinally for substantially the length of and inside of the tube 10. The auger 22 includes a shaft 26 which runs the length of the auger, and one end of the shaft preferably is mounted to and for rotation by a drive motor 28. The motor 28 may be mounted at either end of the auger tube, but is preferably mounted at the discharge head end as shown in the drawings. In the preferred embodiment of the present invention, the motor 28 is a fluid powered motor, preferably a hydraulic motor, which is coupled to a suitable source of fluid pressure (not shown) by supply and return hydraulic conduits 30, 32. The source of fluid power, e.g. hydraulic power, may be from a unit on the bed of the truck drawing a gravity flow wagon box or from the truck itself to which the auger tube 10 is mounted. In the case where the invention is to be utilized to fill an agricultural planter, the source of fluid power may be the tractor which will be utilized to pull the planter once it has been filled.

In the system of the present invention a discharge spout generally 34 is preferably attached to the discharge 20 of the auger tube 10 in the manner generally shown in the drawings, and for receiving and directing the material which is discharged from the discharge opening 20 of the tube. The discharge spout 34 is preferably readily movable relative to the auger tube 10, as shown by the arrows c in FIGS. 1 and 2. This may be readily accomplished by a flexible accordion-like connector conduit 36 attached between the discharge opening 20 and the end 38 of the discharge spout 34 closest to the discharge 20. The opposite end 40 of the discharge spout 34 also includes a discharge opening 42 which is spaced from and remote to the auger tube 10. The discharge spout 34 and its opening 42 can be moved between anyone of a number of positions, two of which are shown in FIG. 2, to permit the selective direction of the discharge of the particulate materials from the system of the invention. In addition, the discharge spout 34 is also preferably adjustable in length, such as telescopically adjustable as shown in solid and dot-and-dash in FIG. 1, and as shown by the arrows d in both FIGS. 1 and 2, so that the actual location of discharge may be readily adjusted by the operator. Because of such wide ranging and free adjustability and mobility of the discharge spout 34 and mobility of the auger tube 10, the system of the invention can be readily utilized to fill all of the seed hoppers of a 16 row planter without the need to interrupt the filling procedure and move the gravity box wagon or truck. In such case, the auger tube 10 may typically be about 14-16 feet in length depending upon whether it is mounted to a gravity box or truck, and the discharge spout 34 may be adjustable between lengths of about 8-14 feet, but may be up to as much as about 20 feet.

The fluid motor 28 in the present invention may either be part of a so-called open center hydraulic system in which the hydraulic fluid is being pumped continuously, or a closed center system in which the hydraulic pump is adjusted to pump only when hydraulic fluid is demanded. This is a particular advantage of the control system of the present invention, i.e. that it is compatible with either of these systems. The manner in which the control system of the present invention starts and stops the rotation of the auger 22 will now be described.

As is typically conventional in such hydraulic control systems, a manually operable bypass valve 44 is mounted to the auger tube 10 adjacent its discharge head end 20. Thus, an operator can control the action of the auger at the auger tube discharge end 20 simply by manipulating the manual valve 44 to either open it so as to bypass hydraulic fluid from the supply conduit 30 to the return conduit 32 thus stopping operation of the motor 28, or to close it so that the hydraulic fluid from the supply conduit 30 passes through the motor 28 to power the motor and rotate the auger 22. The difficulty and disadvantage with this arrangement is that where the discharge spout is for example telescoped to its maximum length of over 14 feet, the operator will most advantageously position himself at the end 40 of the discharge spout 34 in order to direct the discharge. Thereby the operator will be at a location quite remote from the control bypass valve 44 and not be able to turn the motor on and off when it is desired to move to another hopper on the planter. Conversely, if the hydraulic bypass valve 44 would be positioned at the end 40 of the discharge spout 34 so that it would be accessible to the operator, the hydraulic conduits 30 and 32 would also have to be reconfigured. Such reconfiguration and rerouting would typically present difficulties particularly when considering the mobility of the discharge spout 34 and the ability to telescopically adjust its length. This would result in dangling hydraulic hoses which would be subject to snagging and damage and could present a personnel hazard. The use of mechanical control linkages is also very cumbersome if not impossible due to mobility of the components relative to each other and/or the telescopic adjustability of the discharge spout 34.

In the present invention, a normally open electrical solenoid valve 46 is provided on the auger tube 10, and preferably in fluid hydraulic series with the valve 44. This solenoid valve is supplied electrical power, as best seen in FIG. 2, through a conductor 48 on the auger tube 10, a coiled conductor 50 spanning the flexible connector 36 and variable length portion of the discharge spout 34 to the tube 10, and a conductor 52 on the fixed length portion of the spout 34 from the conductor 52 to an electrical control switch 54. The control switch 54 is mounted on the discharge spout 34 adjacent its end 40. This permits the operator to manipulate and position the discharge opening of the discharge spout 34 with both hands while at the same time controlling the switch 54 as needed. The distal end of conductor 48 may be connected to the electrical system of the towing tractor or truck to supply 12 volt electrical energy in a known manner. The coiled conductor 50 preferably is in the nature of a telephone cord coil, and thus will readily accommodate both the free mobility and the telescopic adjustment of the discharge spout 34 without dragging on the ground or otherwise becoming an obstacle to operation or a personnel hazard.

Accordingly, it will be seen that the operation of the motor 28 and auger 22 may be easily controlled from a location adjacent the discharge end 40 of the discharge spout 34. All that need be done is to open the manual valve 44. Because the solenoid valve 46 is normally open already, when the valve 44 is opened, the hydraulic fluid will be bypassed from the supply conduit 30 through the normally open solenoid valve 46, the open manual valve 44 and back through the return conduit 32. In this condition, the operation of the motor 28 and rotation of the auger 22 will cease. When it is desired to rotate the auger 22, the switch 54 adjacent the discharge opening 42 of the discharge spout 34 is closed. This will complete the electrical circuit and energize the solenoid 46 so that its normally open valve will close. Because the solenoid valve 46 is in hydraulic series with the still open manual valve 44, closing of the solenoid valve 46 will close the hydraulic bypass between the supply and return conduits 30, 32 and will cause the hydraulic fluid to be ported to the motor 28 to rotate the auger 22.

In the preferred system of the present invention, a second manually operated bypass valve 56 also is preferably provided which is also remote from the discharge opening 42 of the discharge spout 34. Thus, this valve 56 may be utilized in the event of failure of the electrical system to operate a bypass between the supply and return conduits 30, 32. The valve 56 is preferably provided adjacent the inlet end of the auger tube 10 as shown in the drawings.

It will be understood that although the invention has been described as utilized with mobile agricultural container and particulate materials, the control system of the invention may be used with other non-agricultural containers and materials.

It also will be understood that the preferred embodiment of the present invention which has been described is merely illustrative of the principles of the present invention. Numerous modifications may be made by those skilled in the art without departing from the true spirit and scope of the invention.

I claim:

1. A system for the control of an auger comprising:
   an elongate auger tube having an auger mounted for rotation therein:
   an inlet to said tube for introducing a particulate material to said tube to be conveyed in said tube by said auger when it rotates;
   a discharge from said tube spaced from said inlet, said discharge discharging the material conveyed in said tube from said tube;
   an elongate discharge spout which is adjustable in length and which is attached to said tube for receiving and directing the material discharged from said discharge of said tube, said discharge spout being movable relative to said tube and having a discharge opening spaced from and remote to said tube and tube discharge;
   a motor on said tube and remote to said discharge opening of said discharge spout to rotate said auger in said tube; and
   control means mounted to and selectively operable from a location on said discharge spout adjacent said discharge opening of said discharge spout to start and stop the rotation of said auger, said control means including a control switch mounted to said discharge spout adjacent said discharge opening, and an electrical conductor extending from said switch and over substantially the length of said discharge spout, at least a portion of said electrical conductor also being adjustable in length when the length of said discharge spout is adjusted to accommodate the changes in length of said discharge spout when it is adjusted.

2. The system of claim 1, wherein said discharge spout is telescopically adjustable.

3. The system of claim 2, wherein at least a portion of said electrical conductor is coiled to accommodate the changes in length of said discharge spout when it is telescopically adjusted.

4. The system of claim 1, wherein said control means is electrical.

5. The system of claim 1, wherein said control means also is selectively operable at a second location remote from said location adjacent said discharge opening.

6. The system of claim 5, wherein said control means is capable of being operable from said second location if it is not operable from said location adjacent said discharge opening.

7. A system for the control of an auger comprising:
   an elongate auger tube having an auger mounted for rotation therein;
   an inlet to said tube for introducing a particulate material to said tube to be conveyed in said tube by said auger when it rotates;
   a discharge from said tube spaced from said inlet, said discharge discharging the material conveyed in said tube from said tube;
   a discharge spout attached to said tube for receiving and directing the material discharged from said discharge of said tube, said discharge spout being movable relative to said tube and having a discharge opening spaced from and remote to said tube and tube discharge;
   a fluid powered motor on said tube and remote to said discharge opening of said discharge spout to rotate said auger in said tube; and
   control means mounted to and selectively operable from a location on said discharge spout adjacent said discharge opening of said discharge spout to control the fluid to said motor to start and stop the rotation of said auger.

8. The system of claim 7, wherein said control means bypasses the fluid to said motor to stop the rotation of said auger.

9. The system of claim 8, wherein said control means includes a normally open, solenoid operated fluid bypass valve which when open bypasses the motor.

10. The system of claim 9, including an electrical switch at said location adjacent said discharge opening for operating said solenoid operated fluid bypass valve.

11. The system of claim 9, wherein said control means also includes a second fluid valve which is selectively operable at a second location remote from said location adjacent said discharge opening, and said normally open, solenoid operated fluid bypass valve and said second fluid valve are in series fluid flow relationship to each other.

12. A system for the control of an auger comprising:

an elongate auger tube having an auger mounted for rotation therein;

an inlet to said tube for introducing a particulate material to said tube to be conveyed in said tube by said auger when it rotates;

a discharge from said tube spaced from said inlet, said discharge discharging the material conveyed in said tube from said tube;

a discharge spout attached to said tube for receiving and directing the material discharged from said discharge of said tube, said discharge spout being movable relative to said tube and having a discharge opening spaced from and remote to said tube and tube discharge;

a motor on said tube and remote to said discharge opening of said discharge spout to rotate said auger in said tube; and control means mounted to and selectively operable from a location on said discharge spout adjacent said discharge opening of said discharge spout to start and stop the rotation of said auger, and wherein said control means also is selectively operable at second and third locations, both of which are remote from said location adjacent said discharge opening.

13. The system of claim 12, wherein said control means is capable of being operable from at least one of said second and third locations if it is not operable from said location adjacent said discharge opening.

* * * * *